United States Patent [19]

Correll et al.

[11] 4,383,594
[45] May 17, 1983

[54] CONFIGURATION FOR A DISK BRAKE TORQUE TUBE ASSEMBLY HAVING REPLACEABLE KEYS AND BACKPLATE

[75] Inventors: Harold E. Correll, Uniontown; Richard L. Crossman, Tallmadge, both of Ohio

[73] Assignee: Goodyear Aerospace Corporation, Akron, Ohio

[21] Appl. No.: 271,343

[22] Filed: Jun. 8, 1981

[51] Int. Cl.³ .................. F16D 55/36; F16D 69/04
[52] U.S. Cl. ............................ 188/71.5; 188/71.1; 192/106.1; 403/358
[58] Field of Search ........... 188/71.5, 218 R, 218 XL, 188/218 A, 240, 243, 244, 18 A, 18 R, 205 A, 205 R, 71.1, 73.31, 264 G, 73.39; 192/110 R, 106.1, 110 S, 70.19, 70.2; 403/356, 358

[56] References Cited

U.S. PATENT DOCUMENTS

| | | | |
|---|---|---|---|
| 2,559,885 | 7/1951 | Loweke | 188/73.31 |
| 3,061,050 | 10/1962 | van Horn | 188/71.5 |
| 3,138,032 | 6/1964 | Raso et al. | 403/356 |
| 3,237,731 | 3/1966 | du Bois | 188/218 XL |
| 3,436,106 | 4/1969 | Luenberger | 403/356 |
| 3,480,115 | 11/1969 | Lallemant | 188/71.5 |
| 3,727,477 | 4/1973 | Murphy | 403/356 |
| 3,754,624 | 8/1973 | Eldred | 188/71.5 |
| 3,887,041 | 6/1975 | Malone | 188/71.5 |
| 3,977,631 | 8/1976 | Jenny | 188/71.5 |

FOREIGN PATENT DOCUMENTS

| | | | |
|---|---|---|---|
| 1402535 | 8/1975 | United Kingdom | 188/218 XL |
| 566987 | 8/1977 | U.S.S.R. | 403/356 |

Primary Examiner—Douglas C. Butler
Assistant Examiner—R. R. Diefendorf
Attorney, Agent, or Firm—L. A. Germain; P. E. Milliken

[57] ABSTRACT

A unique configuration for a torque tube assembly associated with a disk type brake comprises separable and replaceable keys and a separable and replaceable brake disk backplate. The keys are mounted in anti-rotation slots at the inboard and outboard ends of the torque tube and bolted to the barrel portion of the torque tube and are characterized by a radial extension that supports the separable backplate. The torque tube is a formed wrought metal tube that is mounted to the stationary portion of the brake housing via bolts that thread into the inboard end of the keys. In this configuration, the occurrence of a defective key and/or backplate does not require replacement of the total torque tube assembly.

14 Claims, 5 Drawing Figures

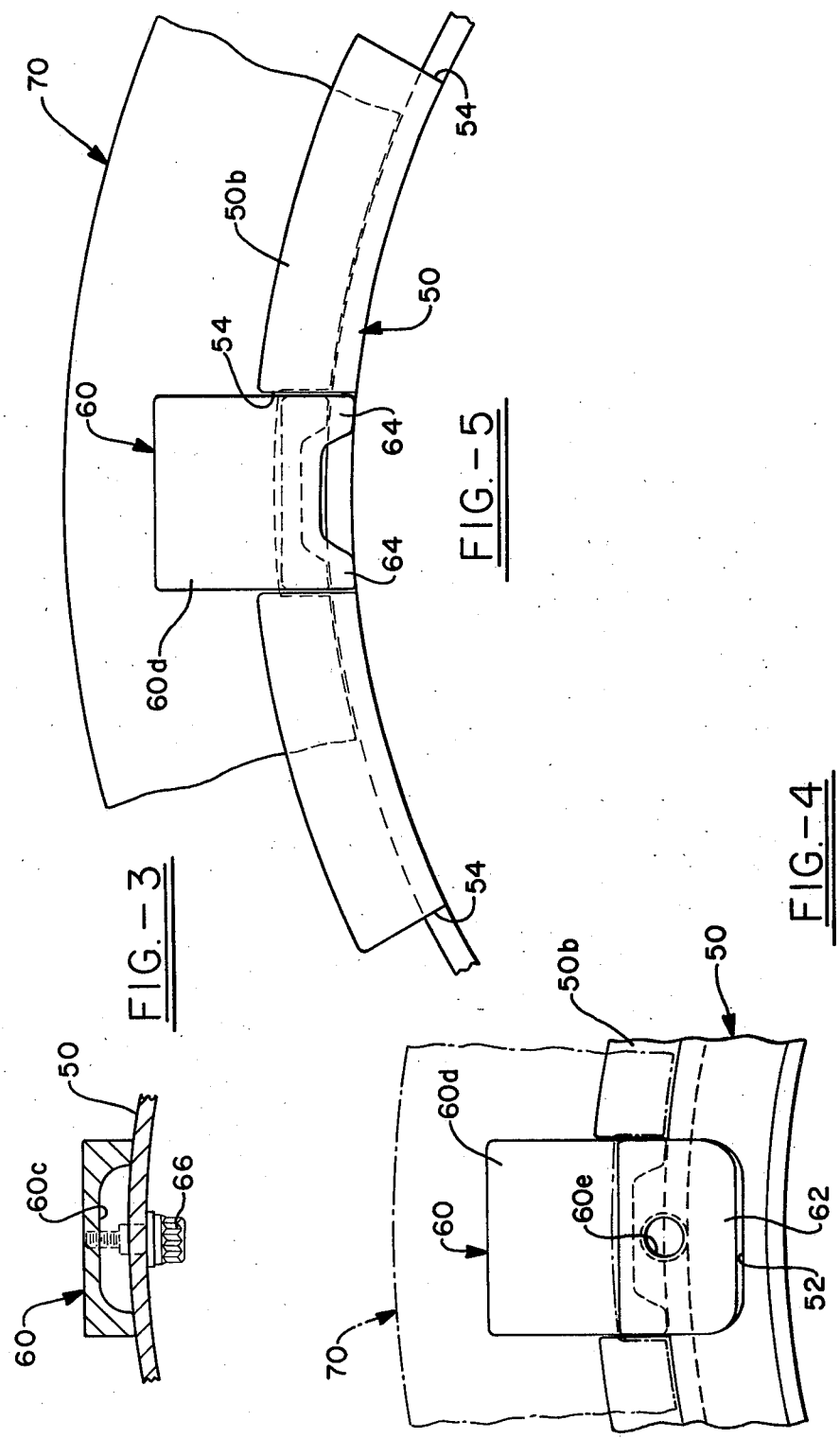

CONFIGURATION FOR A DISK BRAKE TORQUE TUBE ASSEMBLY HAVING REPLACEABLE KEYS AND BACKPLATE

BACKGROUND OF THE INVENTION

This invention generally pertains to disk brakes and more particularly to a unique configuration for a torque tube, drive key, and backplate assembly which may be applied to various type disk brake applications. More specifically, the invention provides a torque tube having separable and replaceable keys and a separable and replaceable backplate. While the invention will be described herein with regard to aircraft wheel and brake configurations, it may as well be applied to other type vehicle disk brake configurations and various industrial brake applications. The invention therefore, is not considered limited in scope by the specific application illustrated in the drawings.

By way of example, FIG. 1 of the drawings is illustrative of a conventional prior art aircraft wheel and brake assembly generally indicated by reference numeral 10. Portions which are pertinent to the invention are indicated in solid lines while less pertinent portions are indicated via ghost lines for the purpose of illustrating the environment thereof. Very generally, a wheel and brake assembly 10 may include a two-part wheel 12 comprised of an inboard wheel half 12a and an outboard wheel half 12b which are fastened together by a plurality of wheel bolts 12c and mounted for rotation about an axle 14 via a plurality of wheel bearings diagramatically indicated at 16. A multi-disk brake assembly generally indicated by reference numeral 20 may be mounted at the inboard side of the wheel 12 within the wheel cavity formed by the inboard wheel half 12a. The brake assembly 20 includes a torque tube 30 mounted via a plurality of bolts 32 to a brake housing 34 having brake actuating means 36 for applying a braking pressure to a pressure plate 38. The pressure plate 38 transmits the braking pressure to a brake stack generally indicated by reference numeral 40 to effect braking of the wheel 12. Wheel braking action is accomplished by the brake stack 40 comprised of alternating brake disks 42 and friction disks 44 either one of which may be keyed for rotation with the wheel 12 or alternatively keyed to be relatively stationary with the torque tube 30. As illustrated in the drawing, the outer periphery of the rotating members of the brake stack 40 are keyed to the inner periphery of the inboard wheel half 12a while the inner periphery of the stationary members of the stack 40 are keyed to the outer periphery of the torque tube 30. Thus, the torque tube 30 plays a primary role in the braking action and the design and construction of it is critical to the effectiveness of the brake system.

Conventionally, torque tubes of the prior art as illustrated in FIG. 1 may comprise a one-piece forged or cast metal member 30 that is machined to close tolerances to provide the keyed interconnections for the stationary members of the brake stack 40. Conventional torque tubes 30 of the prior art may also be characterized by an integral backplate 30b that extends radially at an approximate angle of 90 degrees with respect to the cylindrical portion 30a of the tube and which operates to engage the brake stack 40 when a braking pressure is applied at the opposite end by the actuating means 36 through the pressure plate 38. The prior art torque tube may further be characterized by a tubular portion 30a that carries the keying elements 30c for engagement with the stationary members of the brake stack 40 and these keying elements are conventionally machined into the outer peripheral surface of the torque tube.

Problems associated with conventionally forged or cast and machined torque tubes 30 involve the backplate 30b and the drive key elements 30c. The backplate 30b may develop fractures due to the axial force exerted on it and heat buildup during braking while the keys 30c suffer wear associated with braking action. In this circumstance, and because the backplate and keys are made as an integral part of the torque tube, the total torque tube must be replaced to put the brake assembly back into a safe and reliable operating condition. In this respect, the torque tube 30 is usually the single most expensive element of a typical brake assembly and therefore replacement of it is a major maintenance operation and an expensive proposition.

In view of the above mentioned disadvantages of the presently used torque tube, it is in one aspect of the present invention an object to provide a torque tube assembly that eliminates replacement of the total torque tube when failure occurs to the backplate and/or drive key portions of the assembly.

In another aspect of the invention it is an object to provide a torque tube that is more economical to manufacture and which does not require extensive machining operations and elaborate inspection techniques to meet rigid aircraft and/or industrial specifications.

In another aspect of the invention it is an object to provide a torque tube assembly that has separable drive keys which may be individually replaced when worn or defective keys are detected.

In still another aspect of the invention it is an object to provide a torque tube assembly having a separable backplate that may be easily replaced when such backplate suffers fatigue failure and/or other defects.

In another aspect of the invention it is an object to provide a torque tube that exhibits a longer service life than experienced with presently used one-piece torque tubes and wherein the operational integrity may be more easily tested, and which may be applied to brake assemblies having different diameters and numbers of drive keys.

SUMMARY OF THE INVENTION

In its broad aspect the invention provides an assembly for multi-disk type brakes which provides torque take-out, keying interconnections, and disk stack backup and comprises a cylindrical torque tube having separable drive keys and backplate. The keys are bolted to the tube about its midsection and the ends thereof are seated in anti-rotation slots located at the inboard and outboard ends of the tube and the outboard end of each key has a radial extension that supports a separable backplate mounted at the outboard end of the tube.

BRIEF DESCRIPTION OF THE DRAWINGS

Various features and advantages of the invention will be better understood and appreciated from a consideration of the following detailed description of the preferred embodiment when taken in conjunction with the accompanying drawings in the several figures in which like parts bear like reference numerals and in which:

FIG. 3 is a partial sectional view as may be taken on line 3—3 of FIG. 2;

FIG. 4 is an elevational view of the inboard end showing a portion of the torque tube assembly as may be taken on line 4—4 of FIG. 2; and FIG. 5 is an elevational view of the outboard end showing a portion of the torque tube assembly as may be taken on line 5—5 of FIG. 2.

DETAILED DESCRIPTION OF THE INVENTION

Figure 1:
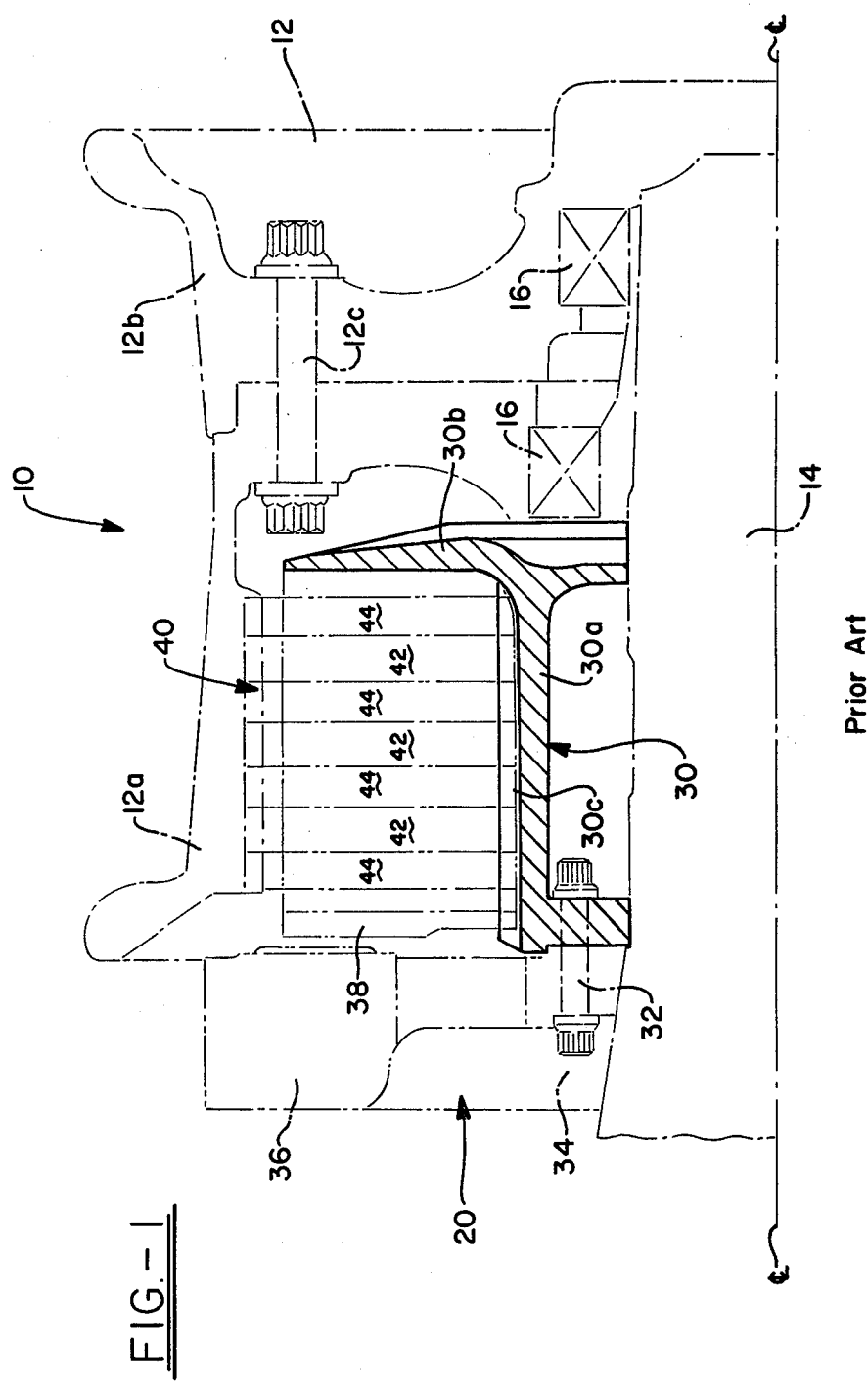
FIG. 1 is a sectional elevational view of a portion of a conventional prior art aircraft wheel and brake assembly, the portions that are pertinent to this invention
Figure 2:
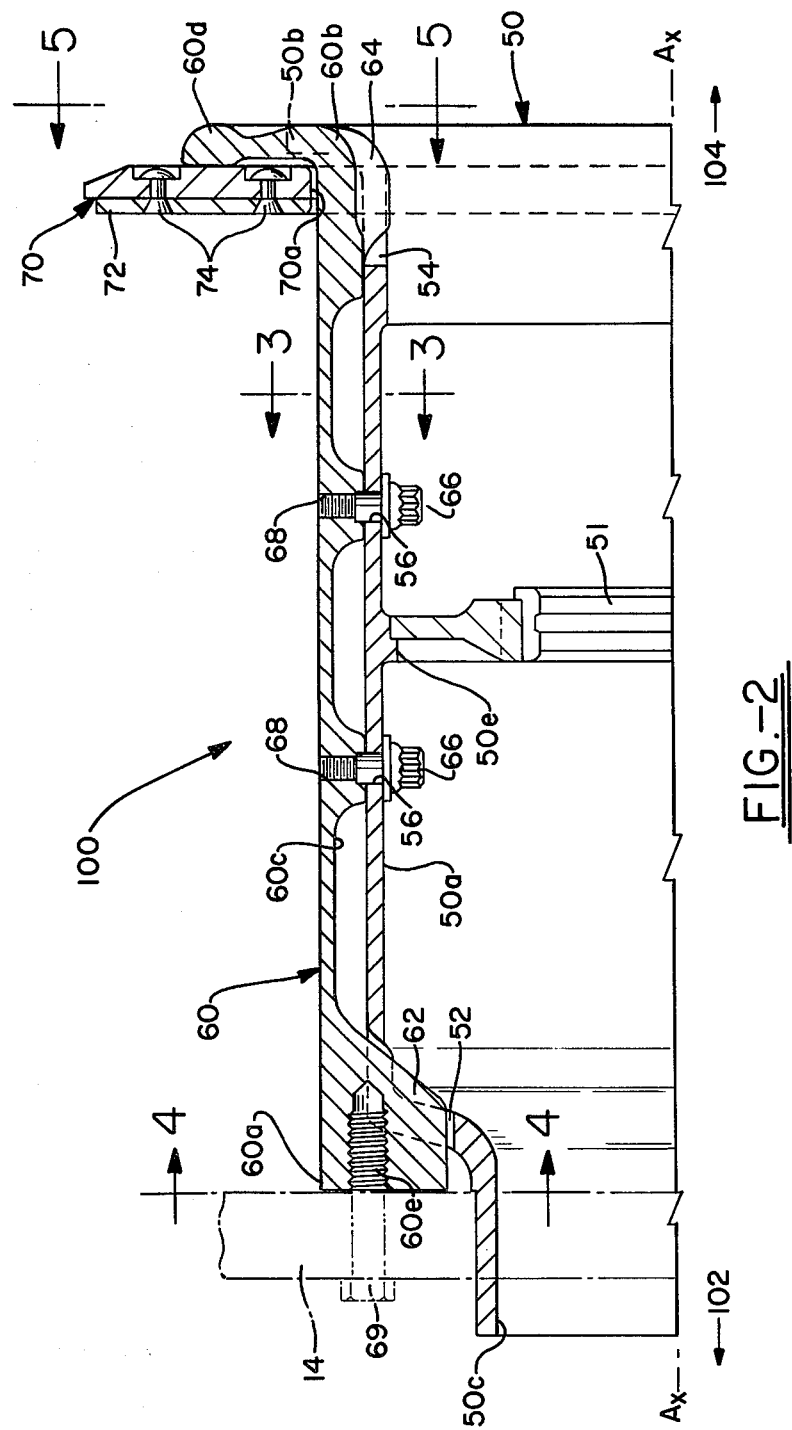
FIG. 2 is an elevational view, in section, of a portion of a torque tube assembly in accordance with this invention.

Referring to FIGS. 2 thru 5 of the drawings, a torque tube assembly in accordance with this invention is generally indicated by reference numeral 100. The assembly 100 may be mounted about an aircraft wheel axle (not shown) having an axis Ax and oriented with respect to an inboard direction indicated by arrow 102 and an outboard direction indicated by arrow 104. The assembly 100 generally comprises a torque tube member 50, a plurality of keys 60 axially aligned about the outer peripheral extent of the torque tube, and a brake backplate 70 mounted at the outboard end of the torque tube 50. The elements comprising torque tube 50, keys 60 and backplate 70 are individual and separable members of the assembly 100 and collectively replace the single torque tube element 30 illustrated in FIG. 1 of the drawings.

The torque tube 50 is an open-ended, wrought metal tube having a barrel portion 50a that terminates at the outboard end in a machine-formed flange 50b extending radially at an approximate angle of 90 degrees with respect to the Ax axis. At the inboard end the tube 50a terminates in a machine-formed restricted bore 50c that is adapted to mount on an axle assembly (not shown) in a conventional manner. The torque tube 50 is characterized by a plurality of slots 52 in spaced relationship about the inboard end of the tube and by an equal plurality of slots 54 in spaced relationship about the outboard end of the tube 50. Each slot 52 at the inboard end is axially aligned with a slot 54 at the outboard end of the tube. The slots 52,54 are cut or machined into the torque tube 50 and each pair of slots 52,54 are of a dimension such as to receive a drive key 60 in spanned relationship between them and in a substantially locking and anti-rotational arrangement as will be more fully understood and appreciated hereinafter. As mentioned, the torque tube 50 is a wrought metal tube and in this respect it may comprise a light gauge stock requiring a minimum amount of machining to shape the tube to the final desired configuration. It is anticipated, however, that any high strength metal may be used for the torque tube including for example steel and titanium. Additionally, the bore of the torque tube 50 may be machined to further decrease its weight and in this respect a center rib 50e may be provided to mount a supporting disc 51 within the bore as a strengthening member. Thus, it will be appreciated by those persons skilled in the brake arts that the torque tube 50 of this invention is a much more simplified product requiring lower cost manufacturing techniques than the presently used one-piece torque tubes.

The torque tube 50 is adapted, by virtue of the slots 52,54, to carry a plurality of keying elements 60 about the outer peripheral surface of the barrel portion of the tube 50a. The keys 60 are forged or cast, bar-like elements that may be made of solid bar stock steel or titanium and may be machined such as at 60c to reduce the weight thereof along the lengthwise extent of the bar. The inboard end 60a of each key 60 is characterized by a protrusion 62 that depends and locks into the inboard slot 52. The outboard end 60b of each key 60 is characterized by a protrusion 64 that depends and locks into the outboard slot 54. The slots 52,54 therefore provide an anti-rotational mounting for each of the keys 60. The keys 60 are further affixed to the torque tube 50 via bolts 66 that are mounted through holes 56 in the barrel portion 50a of the torque tube and threaded into matching threaded holes 68 in the body of the key. When all of the keying elements 60 are mounted and affixed to the torque tube 50 the assembly is bolted to the stationary brake housing 34 via bolts 69 that are threaded into each key 60 via threaded bores 60e provided in the inboard end 60a. In this manner torque-takeout of the brake assembly is provided by reason of the slots 52,54, bolts 66, and bolts 69.

The keys 60 are further characterized at their outboard extent by an extension 60d that extends radially outwardly with respect to the Ax axis. As clearly illustrated in FIGS. 2 and 5 of the drawings, the extension 60d is at an angle of approximately 90 degrees and is oriented within the torque tube slot 54 and aligned with the tube flange 50b. The drive key extensions 60d thus provide support for the backplate 70 by the number of keys mounted on the torque tube.

The backplate 70 is a circular disk having a bore 70a such that the disk may be mounted on the assembly comprising the torque tube 50 and keys 60. The backplate 70 has an overall diameter such as to provide sufficient support to a brake stack ("40" in FIG. 1) that may be mounted on the assembly. As clearly shown in the drawing, the backplate 70 is supported at the outboard extent by the key extension 60d. The backplate 70 may also be provided with a wear plate face 72 that may be affixed to the backplate via any conventional fastening means such as for example rivets 74.

While certain representative embodiments and details have been shown for the purpose of illustrating the invention, it will be apparent to those skilled in the art that various changes and modifications may be made therein without departing from the spirit or scope of the invention.

What is claimed is:

1. In a brake assembly having an inboard end and an outboard end including a brake housing at the inboard end, an axle, a rotatable member on the axle at the outboard end, and a multi-disk brake stack of alternating rotating and stationary components to provide braking of the rotatable member when subjected to a pressure force on the brake stack, a sub-assembly for stationary mounting with respect to the brake housing to provide torque takeout, keying interconnections, and disk brake backup for the brake stack comprising in combination:

a cylindrically shaped torque tube mounted axially about the axle and having an inboard end as determined by the brake housing and an outboard end as determined by the rotating member, said torque tube having a plurality of spaced-apart slots in the tube about the periphery of each end wherein each slot at the inboard end is axially aligned with a respective slot in the outboard end; and a plurality of bar-shaped keys mounted axially on the torque tube in spanned relationship between one of said inboard and one of said outboard slots and engaged within said slots to provide keying interconnections for the stationary components of the brake stack and each said key having a radial extension at the outboard end to provide backup for the brake stack when said stack is subjected to a braking pressure force, said sub-assembly affixed to the brake housing by a plurality of bolts, each said bolt mounted in the brake housing and threadably engaged within the inboard end of a respective key.

2. The subassembly as set forth in claim 1 wherein each key is affixed to the torque tube via at least one bolt passing through the tube and threadably engaged within the body of the key.

3. The sub-assembly as set forth in claim 1 further comprising a backplate disk mounted on the torque tube at the outboard end thereof and abutting the radial extensions of the keys to provide a backpressure plate for the brake stack when subjected to a braking pressure force.

4. The sub-assembly as set forth in claim 3 wherein the backplate disk is also in keying relationship with the keys on the torque tube.

5. The subassembly as set forth in claim 3 wherein the torque tube has a radially extending portion at the outboard end and the outboard end slots are cut through the extension, said radial extension of the tube and radial extensions of the keys providing a continuous radially extending backup for the backplate.

6. The sub-assembly as set forth in claim 1 wherein said torque tube has a radial extension within its bore to provide support to the tube in its mounting on the axle.

7. The sub-assembly as set forth in claim 1 wherein said keys are characterized by inboard and outboard extensions in the body of the key which depend into respective inboard and outboard slots, to seat into and engage the slots to provide torque takeout in the application of the brake.

8. The sub-assembly as set forth in claim 1 wherein the tube has a large diameter throughout the substantial portion of its length terminating through a radial portion in a smaller diameter at the inboard end thereof said inboard end slots being cut into the tube through the radial portion and into the large diameter portion.

9. An improved brake assembly having an inboard end and an outboard end including a brake housing at the inboard end, an axle, a rotatable member on the axle at the outboard end, a torque tube mounted about the axle, a multi-disk brake stack of alternating rotating and stationary components, said rotating components keyed for rotation with the rotatable member and the stationary components keyed to the torque tube to provide braking of the rotatable member when subjected to a pressure force on said brake stack, the improvement comprising:

a cylindrically shaped torque tube having an inboard end as determined by the brake housing and an outboard end as determined by the rotatable member and having a plurality of spaced-apart slots within the body of the tube and about its periphery at the inboard and outboard ends thereof, each said slot at the inboard end being axially aligned with a respective slot at the outboard end; and a plurality of bar-shaped separable keys mounted axially on the torque tube, each key in spanned relationship between one of said inboard and one of said outboard slots and engaged within the slots and affixed to the tube via at least one bolt at the approximate midsection of the tube and threadably engaged within the body of the key, each said key having a radial extension at the outboard end thereof to provide backup support for the brake stack when a braking pressure is applied to the inboard end of the stack and each said key having a threaded bore at the inboard end wherein the torque tube and keys are mounted to the brake housing by a plurality of bolts extending through the housing and received within a respective key.

10. The brake assembly as set forth in claim 9 wherein the torque tube is characterized by a radial extension at the outboard end thereof and said outboard slots are cut through said radial extension, the radial extension of the torque tube and the radial extension of the keys providing a continuous radially extending backup for the brake stack.

11. The brake assembly as set forth in claim 10 wherein a separable backplate disk is mounted on the torque tube, at the outboard end thereof, which disk abuts the radial extensions of the keys and torque tube.

12. The brake assembly as set forth in claim 9 wherein the torque tube is characterized by a large diameter throughout the substantial portion of its length terminating through a radial portion in a restricted diameter at the inboard end thereof, said inboard end slots being cut into the tube through the radial portion and into the large diameter portion.

13. The brake assembly as set forth in claim 12 wherein the torque tube is characterized by a radially extending rib within the bore of the tube to provide support of the tube in its mounting about the axle.

14. The brake assembly as set forth in claim 9 wherein each bar-shaped key is mounted on the torque tube via at least two bolts threaded into the body portion of the key at spaced positions along the length of the key and portions of the body of the key outside the influence of the bolts are machined to reduce the weight of the key.

* * * * *